Dec. 6, 1932.    G. E. FARLEY    1,889,980

SWIVELED TIRE INFLATING CHUCK

Filed Sept. 30, 1929

INVENTOR:—
GEORGE E. FARLEY.
By Martin P. Smith
ATTY.

Patented Dec. 6, 1932

1,889,980

UNITED STATES PATENT OFFICE

GEORGE E. FARLEY, OF SOUTH GATE, CALIFORNIA, ASSIGNOR TO SERVICE EQUIPMENT COMPANY, OF SOUTH GATE, CALIFORNIA

SWIVELED TIRE INFLATING CHUCK

Application filed September 30, 1929. Serial No. 396,186.

My invention relates to a swiveled chuck for tire inflators and has for its principal object, the provision of a relatively simple, practical and highly efficient chuck that is carried by the end of a compressed air hose and which is adapted to be detachably applied to the end of the filling nipple of a pneumatic tire or other inflatable member and which chuck is mounted so as to rotate or swivel upon the tubular member or nipple that is seated in the end of the compressed air supply hose.

Further objects of my invention are, to construct the chuck so as to effectually prevent leakage of compressed air through the swiveled joint between the chuck and the nipple that is seated in the end of the compressed air hose, to provide the head of the chuck with a recess that receives the threaded end of the filling nipple that is carried by the pneumatic tire or other inflatable member, said recess having arranged therein a combined cushion and packing member of rubber that is compressed upon the insertion of the nipple so as to produce a fluid pressure tight joint between the end of said nipple and the combined packing member and cushion and, further, to arrange within the recess in the head of the chuck, an internally threaded collar that is effective in engaging the threaded portion of the inserted nipple so as to produce an interlocking engagement between the chuck and nipple during the flow of compressed air through the hose and chuck into the nipple and the tire or other inflatable member in which said nipple is seated.

With the foregoing and other objects in view, my invention consists in certain novel features of construction and arrangement of parts that will hereinafter be more fully described and claimed and illustrated in the accompanying drawing, in which:

Figure 1:
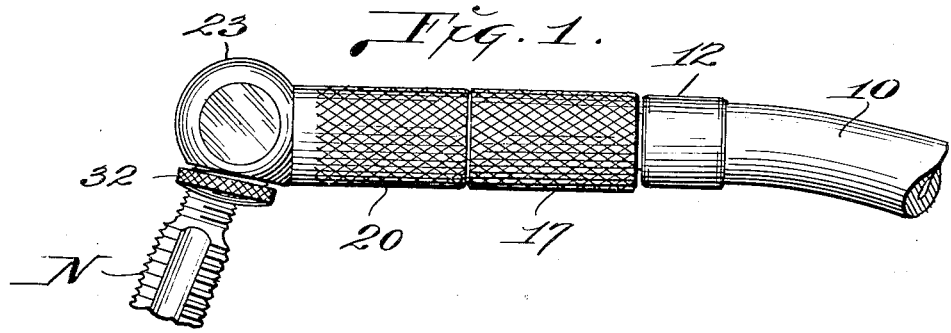
Fig. 1 is an elevational view of a swiveled chuck embodying the principles of my invention.

Referring by numerals to the accompanying drawing which illustrates a practical embodiment of my invention, 10 designates a compressed air hose that is connected to a suitable source of compressed air supply, for instance, a storage tank or pump and seated in the outer end of said hose is one end of a tubular stem or member 11 and the inserted portion of this stem is secured to the hose by a clamping sleeve or ferrule 12.

A portion of the body of the tubular member 11 projects a short distance beyond the end of the hose and formed integral with the end of said projecting portion is a short cylindrical head 13 in the outer portion of which is formed a circular recess 14.

Seated in the end of the axial bore 15 through member 11 is one end of a small tube 16 of metal which projects outwardly through chamber 14 and terminates a short distance beyond the end of the cylindrical head 13.

Mounted for rotary movement upon the tubular member 11 between the head 13 and the flanged inner end of sleeve or ferrule 12 is a sleeve 17 provided in its outer portion with a circular chamber 18 that receives head 13. The forward portion of the wall of sleeve 17 is internally threaded for the reception of the externally threaded end portion 19 of the body 20 of the chuck.

Formed in the outer portion of the end portion 19 of the body of the chuck is a circular recess 21, preferably of the same diameter as the recess 14 in the head 13 and arranged within the chamber formed between recesses 21 and 14 and spaced apart from the projecting portion of tube 16 is a packing ring 22, preferably of rubber.

Figure 2:
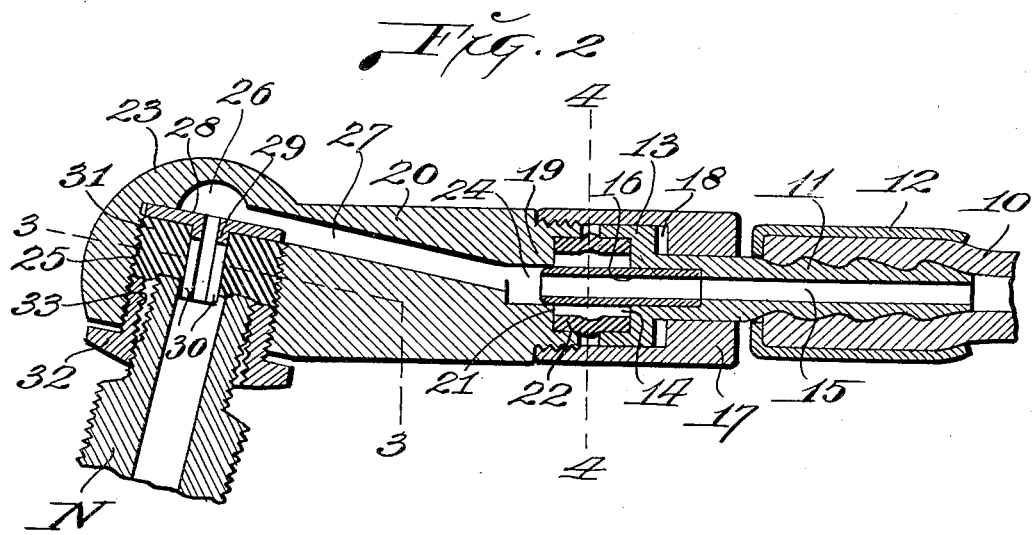
Fig. 2 is a section taken lengthwise through the center of my improved swiveled chuck.
Figures 3, 4:
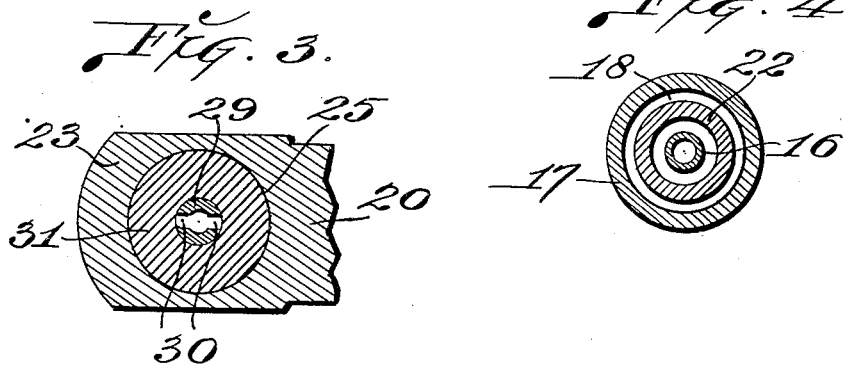
Fig. 3 is a horizontal section taken on the line 3—3 of Fig. 2.
Fig. 4 is a cross section taken on the line 4—4 of Fig. 2.

The end of the body 20 opposite the end that is provided with the externally threaded projecting portion 19 is enlarged to form a head 23 and formed in the end of body 20 and projecting inwardly from the recess 21 is a recess 24 into which the end of tube 16 projects when the body 20 of the chuck is secured to sleeve 17 as illustrated in Figs. 1 and 2.

Formed in the head 23 is a threaded recess 25, the axis of which is arranged at a slight angle relative to a plane at right angles to the axis of body 10 and formed at the inner end of said threaded recess 25 is a relatively small recess 26 that is connected to recess 24 by a duct or bore 27.

Removably seated at the inner end of recess 25 is a disc 28 and formed integral therewith and projecting outwardly from the center thereof is a tubular stem 29, the outer portion of which is transversely slotted as designated by 30. Arranged on the stem 29 and positioned against the underside of disc 18 is a packing ring 31 of rubber and the thickness of this packing ring is such that the slotted lower end of stem 29 projects a short distance below the under surface of said packing ring.

This packing ring is retained in position within the head 23 by a bushing ring 32 having an externally threaded portion that is screw seated in the lower portion of the threaded recess 25 and when so positioned the upper or inner edge of the bushing bears against the marginal portion of packing ring 31.

The inner surface of the bushing is provided with a thread 33 that has the same pitch and the number of threads per inch as the standard thread that is formed on the reduced end portion of the standard forms of pneumatic tire filling nipples N.

The diameter of the threaded opening through bushing 32 is slightly greater than the external diameter of the reduced end portion of the standard forms of filling nipples.

In the use of my improved tire inflating chuck the head thereof is applied to the reduced end of the filling nipple N so that said reduced end enters the internally threaded bushing 32 and the end of said reduced portion of the nipple engages against the under face of the elastic packing ring 31 and with the lower end of stem 29 projecting a short distance into the end of the nipple.

The operator now presses the chuck toward the nipple so as to compress packing ring 31 and produce a fluid pressure tight joint between said packing ring and the end of the nipple end at the same time the chuck is rocked vertically a slight distance so that the threads 33 at the lower end of the bushing 32 at one side thereof will engage the threads on the lower portion of the reduced end of the nipple N and simultaneously the threads on the upper portion of the bushing and on the opposite side thereof will engage the threads on the reduced portion of the nipple adjacent to its upper end and as a result of this interlocking engagement the chuck is firmly secured to the end of the filling nipple during the inflating operation and further, such action retains the end of the nipple in engagement with the packing ring 31 so as to prevent the escape of fluid pressure between said packing ring and the end of the nipple.

When the chuck is tilted relative to the nipple to produce the interlocking engagement of the threads on opposite sides and at opposite ends of the reduced end portion of the nipple and the bushing, one side of the packing ring 31 will be compressed to a greater degree than the other side but as said packing ring is of substantial thickness, that portion that is compressed to the greatest degree will act through the body of the ring to cause the opposite portion thereof to tend to expand with the result that all portions of the underface of the packing ring will engage the end of the nipple so as to produce a fluid pressure tight joint and consequently prevent the leakage of fluid pressure while the chuck is in use.

While the chuck is in service and compressed air is flowing from the hose 10 through said chuck, air that enters the chamber 14 will tend to expand the packing ring 22 with the result that the intermediate portion thereof will be forced outwardly between the adjacent ends of head 13 and reduced end portion 19 of the body 20, consequently preventing the escape of fluid pressure in the threaded joint between the members 17 and 20.

By mounting the sleeve 17 so that the same rotates freely on tubular stem 17, the entire body of the chuck may be rotated in either direction so as to enable the recess in the head thereof to be readily applied to the end of a filling nipple.

The recess 25 in the head 23 is formed at a slight angle relative to a plane at right angles to the axis of the body 20 in order that the head of the chuck may be more conveniently applied to the threaded end of a filling nipple and in order to minimize the size of the head 23 the packing ring 31 is located in the upper portion thereof and for this reason it is necessary to incline the duct 27 that connects the recess 24 which occupies a central position at one end of the body 20 with the recess 26 that is formed within the upper portion of head 23 beyond recess 25 that receives the packing ring 31 and bushing 32.

Bushing 32 is internally threaded throughout its length and the internal diameter of said bushing is slightly greater than the external diameter of the threaded ends of standard filling nipples. As a result of this construction the end of the nipple that is inserted in the bushing is interengaged with the internal thread of said bushing at two different points which are diagonally opposite to each other and thus when the chuck is applied to the nipple and tilted slightly to effect the two-point engagement, said chuck is very firmly secured to the end of the nipple during the inflating operation.

Thus it will be seen that I have provided a swiveled chuck for tire inflators that is relatively simple in construction, inexpensive of manufacture, capable of being rotated in either direction at the end of the air hose so as to be conveniently applied to a filling nipple and the recess within the head of which chuck is provided with means for effecting an interlocking engagement with the inserted end of the filling nipple and for producing a fluid pressure tight joint between said nipple and chuck.

It will be understood that minor changes in the size, form and construction of the various parts of my improved swiveled chuck for tire inflators may be made and substituted for those herein shown and described without departing from the spirit of my invention, the scope of which is set forth in the appended claims.

I claim as my invention:

1. In a swiveled chuck for tire inflators, a tubular stem adapted to be seated in the end of an air hose, a two-part chuck body mounted for rotary movement upon said stem, tubular means within said two-part chuck body for producing a fluid pressure tight joint between said stem and two-part body and the outer end of said body being provided with a threaded recess for the reception of the end of an externally threaded filling nipple the threads on said nipple engaging the upper and lower opposite threads of said recess.

2. In a swiveled chuck for tire inflators, a tubular stem adapted to be seated in the end of an air hose, a two-part chuck body mounted for rotary movement upon said stem resilient tubular means within said two-part chuck body for producing a fluid pressure tight joint between said stem and two-part body whereby limited axial movement of the body with respect to the stem is permitted, the outer end of said body being provided with a threaded recess for the reception of the end of a filling nipple and a packing ring arranged within said recess and adapted to be engaged by the end of the inserted filling nipple.

3. In a swiveled chuck for tire inflators, a tubular stem adapted to be seated in the end of an air hose, an offset annular flange at the opposite end of the stem, a tube carried by and coaxially disposed on said end of the stem, a collar surrounding said stem and said annular flange, a chuck body having an elongated conduit forming a continuation of the said stem and tube connected to said collar, an annular flange upon the end of said chuck body of substantially the same diameter as said offset annular flange, a tubular packing member carried within said annular flange and offset annular flange and spaced from said tube to render the juncture between the stem, collar and chuck fluid tight, and means in the end of said chuck to engage a tire filling nipple.

4. In a swiveled chuck for tire inflators, a tubular stem adapted to be seated in the end of an air hose, an offset annular flange in the opposite end of the stem, a tube carried by and coaxially disposed on said end of the stem, a collar surrounding said stem and said annular flange, a chuck body connected to said collar, an annular flange upon the end of said chuck body of substantially the same diameter as said offset annular flange and disposed in abutting relationship with the end of said offset annular flange, said chuck body being provided with a conduit forming a continuation of said stem and tube, a tubular packing member carried within the annular flange on the stem and the annular flange on the chuck body to render the abutting juncture between the annular flange and offset annular flange fluid tight, and means at the end of said chuck body to engage a tire filling nipple.

5. In combination, a fitting having an air conduit provided therein, a bore in one end of said fitting, a stem having an air conduit provided therein, said stem being adapted to be connected to an air hose, an annular offset portion formed integral with one end of the stem, said offset portion being disposed adjacent an end of said bore and being coaxial with and of substantially the same diameter as said bore, means for limiting axial movement of said stem with respect to said fitting but permitting rotation of said stem with respect to said fitting, a resilient sleeve positioned between said stem and said fitting and within said annular offset portion, said sleeve being radially expansible whereby air passing through said fitting and stem is prevented from passing between said fitting and annular offset portion of the stem.

6. A device of the character described comprising a fitting including a cylindrical portion, said cylindrical portion having a main bore extending inwardly from the end thereof, said cylindrical portion having a counter bore of a diameter less than the diameter of the main bore, and extending from the inner end of the main bore, a tubular member adapted to be connected at one end to a hose, the other end of said tubular member projecting within the main bore in a position with its end adjacent to the outer end of the counter bore, means connecting said tubular member to said fitting to limit axial movement of the tubular member while permitting relative rotation between it and the fitting, a cylindrical expansible sleeve positioned between the tubular member and the bore end of the fitting, said expansible sleeve being adapted to be radially expanded by air under pressure passing through the fitting and through said tubular member whereby to prevent leakage of air around said tubular member from between the ends of the tubular member and the fitting.

In testimony whereof I affix my signature.

GEORGE E. FARLEY.